United States Patent [19]
Seiler et al.

[11] Patent Number: 5,641,821
[45] Date of Patent: Jun. 24, 1997

[54] POLYPROPYLENE MOLDING MATERIALS

[75] Inventors: Erhard Seiler, Ludwigshafen; Werner Schöne, Schriesheim, both of Germany

[73] Assignee: BASF Aktiengesellschaft, Ludwigshafen, Germany

[21] Appl. No.: 418,607

[22] Filed: Apr. 7, 1995

[30] Foreign Application Priority Data

Apr. 15, 1994 [DE] Germany ............... 44 13 058.9

[51] Int. Cl.[6] .......................................... C08L 23/02
[52] U.S. Cl. .................. 524/232; 428/34.1; 428/35.1; 524/230; 524/233
[58] Field of Search ............... 524/232, 233, 524/230, 35.1, 34.1

[56] References Cited

U.S. PATENT DOCUMENTS

| | | | |
|---|---|---|---|
| 4,528,312 | 7/1985 | Edwards | 524/232 |
| 4,675,122 | 6/1987 | Lüers et al. | 252/18 |
| 4,839,234 | 6/1989 | Kakugo et al. | 428/349 |
| 5,225,466 | 7/1993 | Akao | 524/108 |
| 5,286,525 | 2/1994 | Chen et al. | 427/256 |

FOREIGN PATENT DOCUMENTS

| | | |
|---|---|---|
| 476401 | 3/1992 | European Pat. Off. . |
| 577321 | 1/1994 | European Pat. Off. . |
| 1233033 | 10/1986 | Japan ................ 524/232 |
| 867280 | 6/1958 | United Kingdom ........... 524/232 |

*Primary Examiner*—Ana Woodward
*Attorney, Agent, or Firm*—Keil & Weinkauf

[57] ABSTRACT

Molding materials comprising
- A) polymers of propylene and up to 20% by weight of further monomers, containing
- B) from 0.05 to 0.4% by weight of a monofunctional or polyfunctional carboxamide or of a carboxamide mixture having a molecular weight of from 150 to 600 and
- C) from 0.1 to 3.0% by weight of an ethylene polymer with up to 20% by weight of comonomers, having a density of from 0.890 to 0.945 g/cm$^3$ and an MFI of from 10 to 100 g/10 min, measured according to ISO 1133 at 190°C./2.16 kg.

The films and moldings produced using the novel molding materials have particularly good frictional properties.

7 Claims, No Drawings

POLYPROPYLENE MOLDING MATERIALS

The present invention relates to polypropylene molding materials comprising

A) polymers of propylene and up to 20% by weight of further monomers, containing B) from 0.05 to 0.4% by weight of a monofunctional or polyfunctional carboxamide or of a carboxamide mixture having a molecular weight of from 150 to 600 and C) from 0.1 to 3.0% by weight of an ethylene polymer with up to 20% by weight of comonomers, having a density of from 0.890 to 0.945 g/cm$^3$ and an MFI of from 10 to 100 g/10 min, measured according to ISO 1133 at 190° C./2.16 kg.

The present invention furthermore relates to the use of these molding materials for the production of moldings and films and to moldings and films produced from the molding materials.

Propylene homopolymers and copolymers of propylene with further monomers (summarized below under the name propylene polymers) are known to be used for the production of films and moldings of all types.

For some purposes, the material has to have particularly good frictional properties, for example in the case of films for the packaging industry and moldings which are subjected to frictional stresses, such as pistons and barrels of injection syringes. These good frictional properties are obtained by adding lubricants, various carboxamides being primarily suitable, for example oleamide.

However, the fact that the moldings or films produced from the molding materials exude the lubricant has proven disadvantageous. This leads to undesirable opacity of the films and moldings and to contamination of the substances which come into contact with them.

It is an object of the present invention to remedy these disadvantages.

We have found that this object is achieved by the molding materials defined at the outset. We have also found the use of these molding materials for the production of films and moldings.

A suitable component A is primarily polypropylene. However, copolymers with up to 20, preferably from 0.1 to 10, in particular from 0.5 to 8, % by weight of further monomers, such as C$_2$–C$_8$-alk-1-enes, especially ethylene, and of mixtures of these monomers are also suitable.

In line with the requirements set for an industrial material, these polymers preferably have a melt flow index (MFI) of from 0.1 to 100, in particular from 1.5 to 80, g/10 min, measured according to ISO 1133 at 230° C. and 2.16 kg load.

The polymers A which may be used alone or in the form of a mixture are known per se and are for the most part commercially available or obtainable in a manner known per se, so that further information is unnecessary here.

For example, propylene homopolymers having an MFI of from 8 to 25 g/10 min and copolymers of 98% by weight of propylene and 2% by weight of ethylene, having an MFI of from 8 to 25 g/10 min, have proven particularly suitable.

Components B are completely amidated monobasic or polybasic carboxylic acids having a molecular weight of from 150 to 600, preferably the amides of saturated and unsaturated fatty acids of the series from nonanamide (MW=157) to C40 fatty amide (MW=591).

In the novel materials containing amides of this range, there is no tendency toward blooming of the amide. Nevertheless, frictional properties otherwise achievable only with relatively large amounts of lubricant are obtained.

Fatty amides having a molecular weight of from 280 to 350 are particularly suitable, oleamide (9-octadecenamide) and erucamide (13-docosenamide) being particularly noteworthy. In addition to the amides of monobasic fatty acids, those of polybasic acids, for example ethylenebisoleamide and ethylenebisstearylamide, are also suitable. Mixtures of different amides conforming to the definition may also be used.

The amides B are for the most part known and are also commercially available and can be prepared in a known manner.

The amount of the amides B in the novel molding materials is from 0.05 to 0.4, preferably from 0.1 to 0.3, % by weight.

The ethylene polymers C have a density of from 0.890 to 0.945, preferably from 0.900 to 0.935, g/cm$^3$ and a melt flow index (MFI) of from 10 to 100, preferably from 20 to 50, g/10 min, measured according to ISO 1133 at 190° C./2.16 kg.

Homopolymers of ethylene as well as copolymers of ethylene with up to 20, preferably from 2 to 10, % by weight of other monomers, especially propylene, C$_4$–C$_8$-alk-1-enes or mixtures of these olefins, are particularly suitable. Further suitable comonomers are acrylic acid, methacrylic acid, C$_1$–C$_{10}$-esters of these acids and carboxylates of vinyl alcohol, or mixtures of these polar monomers.

The ethylene polymers are known per se, some being commercially available, or are obtainable in a manner known per se.

The amount of component C in the novel molding materials is from 0.1 to 3.0, preferably from 0.2 to 2.0, % by weight.

The novel molding materials comprising the three components (A) to (C) can be used alone for the production of films and moldings, or as mixtures with any additives, such as dyes, pigments, light stabilizers, fillers, antioxidants, antistatic agents, corrosion inhibitors and nucleating agents, in the amounts which are usual for the particular purpose. Moreover, the novel molding materials may also contain liquid paraffins and/or silicone oils and may also be mixed with other molding materials.

The molding materials can be prepared by the conventional mixing and plastication methods, the order in which the components are mixed being unimportant. Components A to C and, if required, the additives are preferably mixed in dry form and are melted in an extruder, where they are then homogenized.

The novel molding materials can be particularly advantageously processed to give films and moldings having good transparency and good frictional properties.

EXAMPLES

The following components were used here for the molding materials according to the invention and those according to the prior art:

A/1 Copolymer of 97.5% by weight of propylene and 2.5% by weight of ethylene, MFI=15 g/10 min or A/2 Polypropylene, MFI=22 g/10 min, B/1 Oleamide and C/1 Polyethylene, density=0.925 g/cm$^3$, MFI=45 g/10 min.

These components also contain 0.2% by weight, based on the amount of components A/1 to C/1 or A/2 to C/1, of dimethylbenzylidenesorbitol as a nucleating agent.

EXAMPLES 1 to 3 and COMPARATIVE EXAMPLES 1 V to 3 V

Novel molding materials were processed to give barrels of disposable syringes.

The barrels were stored for 7 days at 60° C., after which the frictional properties were determined during handling and practice and the blooming was determined visually.

The Table shows the details of these tests.

TABLE

| Test | Molding material | % by weight | Frictional properties | Blooming |
|---|---|---|---|---|
| 1 | A/1, | 98.9 | good | none |
|   | B/1, | 0.1 |   |   |
|   | C/1, | 1.0 |   |   |
| 1 V | A/1, | 99.9 | insufficient | none |
|   | B/1, | 0.1 |   |   |
| 2 | A/1, | 97.9 | good | none |
|   | B/1, | 0.1 |   |   |
|   | C/1 | 2.0 |   |   |
| 2 V | A/1, | 99.8 | good | substantial |
|   | B/1, | 0.2 |   |   |
| 3 | A/2, | 98.9 | good | none |
|   | B/1, | 0.1 |   |   |
|   | C/1, | 1.0 |   |   |
| 3 V | A/2, | 99.9 | insufficient | none |
|   | B/1, | 0.1 |   |   |

EXAMPLE 4

The composition of components A/1 to C/1 is shown in Example 1.

A molding material comprising 98.83% by weight of component A/1, 0.17% by weight of component B/1 and 1.00% by weight of component C/1, which also contains 0.15% by weight, based on the amount of A/1 to C/1, of $SiO_2$ as an antiblocking agent, was processed to give films having a thickness of 50 μm.

The films had good transparency, exhibited very little blooming and had a coefficient of friction of 0.13, measured according to DIN 53 375. In this test, a film loaded with a weight is moved over a firmly clamped film, the sliding friction force is determined and the quotient of sliding friction force and normal force is calculated.

The same coefficient of friction was achieved with 2.0% by weight of C/1, whereas the coefficient of friction increased to 0.30 in the absence of component C/1.

We claim:

1. A molding material comprising

A) homopolymers of propylene or copolymers of propylene and up to 20% by weight of further monomers selected from the group consisting of $C_2$–$C_8$-alk-1-enes and mixtures thereof, B) from 0.05 to 0.4% by weight based on the weight of the molding material of a monofunctional or polyfunctional carboxamide or of a carboxamide mixture having a molecular weight of from 150 to 600 and C) from 0.1 to 3.0% by weight based on the weight of the molding material of a homopolymer of ethylene or copolymers of ethylene with up to 20% by weight of comonomers selected from the group consisting of propylene, $C_4$–$C_8$-alk-1-enes or mixtures thereof, acrylic acid, methacrylic acid, $C_1$–$C_{10}$-ester of acrylic acid or methacrylic acid and carboxylates of vinyl alcohol or mixtures of these acids, esters and carboxylates, having a density of from 0.890 to 0.945 g/cm$^3$ and an MFI of from 20 to 100 g/10 min, measured according to ISO 1133 at 190° C./2.16 kg.

2. The molding material defined in claim 1, wherein component A is a homopolymer of propylene.

3. The molding material defined in claim 1, wherein component A is a copolymer of from 90 to 99.9% by weight of propylene and from 0.1 to 10% by weight of one or more monomers selected from the group comprising $C_2$–$C_8$-alk-1-enes.

4. The molding material defined in claim 1, wherein the amount of component B is from 0.08 to 0.2% by weight based on the weight of the molding material.

5. The molding material defined in claim 1, wherein component B is 13-docosenamide (erucamide) or 9-octadecenamide (oleamide) or a mixture of these amides.

6. A film or molding formed from the molding material defined in claim 1.

7. An injection syringe formed from the polypropylene molding material defined in claim 1.

* * * * *